Figure 1:
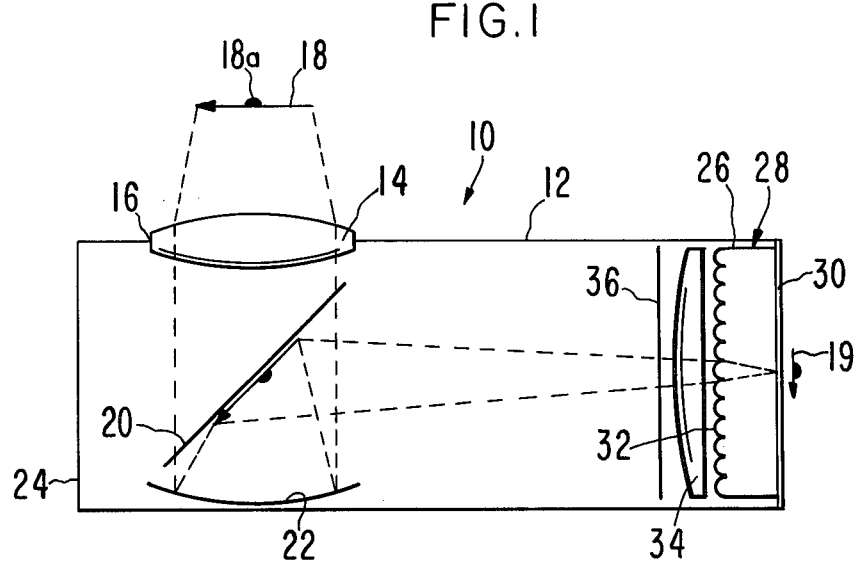

United States Patent [19]

McKee

[11] Patent Number: 4,487,490
[45] Date of Patent: Dec. 11, 1984

[54] INSTANTANEOUS THREE-DIMENSIONAL CAMERA

[76] Inventor: William J. McKee, 1333 Carterwood Pl., San Jose, Calif. 95121

[21] Appl. No.: 408,405

[22] Filed: Aug. 16, 1982

[51] Int. Cl.³ .............................................. G03B 35/08
[52] U.S. Cl. ................................................... 354/115
[58] Field of Search ............... 354/112, 113, 114, 115, 354/116, 117

[56] References Cited

U.S. PATENT DOCUMENTS

| | | | |
|---|---|---|---|
| 3,675,554 | 7/1972 | Bonnet | 354/112 |
| 3,882,513 | 5/1975 | Bonnet | 354/115 |
| 4,180,313 | 12/1979 | Inuiya | 354/112 |

Primary Examiner—A. A. Mathews
Attorney, Agent, or Firm—Townsend and Townsend

[57] ABSTRACT

A camera for taking true three-dimensional photographs in which the camera includes a housing having a lenticulated screen for focusing the image of an object on a plurality of locations on a photographic film. The screen and film are mounted in fixed positions at one end of the housing and light rays from an object to be photographed enter an opening in the housing near the opposite end thereof. A beamsplitter divides the incoming light rays and directs a portion of the light rays onto a mirror which causes the light rays to converge and to be reflected back onto the beamsplitter and then toward and through the lenticulated screen to the film. In one embodiment, the mirror is a concave mirror; in a second embodiment, the mirror is a convex mirror. The only moving part of the camera is the shutter, preferably a curtain shutter.

3 Claims, 2 Drawing Figures

INSTANTANEOUS THREE-DIMENSIONAL CAMERA

This invention relates to improvements in photographic cameras for taking three-dimensional photographs and, more particularly, to a camera for taking true three-dimensional pictures without moving the film in the camera.

BACKGROUND OF THE INVENTION

Cameras for taking three-dimensional photographs have been used in the past. A conventional camera of this type has a film mounted in the camera in such a way so as to move relative to and past a lenticulated screen. Thus, a plurality of images of an object to be photographed can be applied to the film, which images represent different aspect views of the object. When viewing the film, the film must be placed to the rear face of the same or an identical lenticulated screen and the observer, by moving the head back and forth, can obtain a three-dimensional image by looking through the screen while facing the lenticulated surface thereof. A camera of this type is complex in construction and requires frequent adjustment.

Another type of camera has been designed in which a lenticulated screen is used but the film does not move in the camera. However, the resulting three-dimensional image on the film is not a true image but a pseudo image in which the various parts of the image representing corresponding parts of the object are reversed from top to bottom and from left to right.

To avoid the problems associated with the cameras of the types described above, a need has arisen for an improved camera for making true three-dimensional photographs.

SUMMARY OF THE INVENTION

The present invention satisfies the aforesaid need by providing an improved camera which has a housing provided with an opening for receiving light rays from an object to be photographed. The camera has a beamsplitter and a mirror optically aligned with the opening and the mirror operates to focus and invert the light rays after they have passed through the beamsplitter. This allows the light rays to converge toward a lenticulated screen having a film mounted in a fixed position on the rear face thereof remote from its front, lenticulated surface. Thus, the image of an object to be photographed passes into and through the camera and onto the film to provide a true three-dimensional image while the film remains stationary. When the film is developed, the image on the film can be viewed through the lenticulated screen to provide a three-dimensional effect.

An advantage of the present invention over cameras of the type having moving films is that, in the present invention, the film is stationary relative to the lenticulated screen. Thus, the camera of the present invention is simple in construction, is inexpensive to produce and maintain, and requires no special skills on the part of the user. An advantage of the present invention over conventional cameras of the type having fixed films for taking three-dimensional photographs is that, in the present invention, the resulting image on the film is a true three-dimensional image rather than a pseudo three-dimensional image.

The primary object of the present invention is to provide a camera capable of taking three-dimensional photographs in which a lenticulated screen and a photographic film are in fixed positions in the camera housing and incoming light rays are inverted and focused on the film to provide true three-dimensional photographs without requiring any moving parts except a movable shutter.

Other objects of this invention will become apparent as the following specification progresses, reference being had to the accompanying drawings for an illustration of several embodiments

IN THE DRAWINGS

Figure 2:
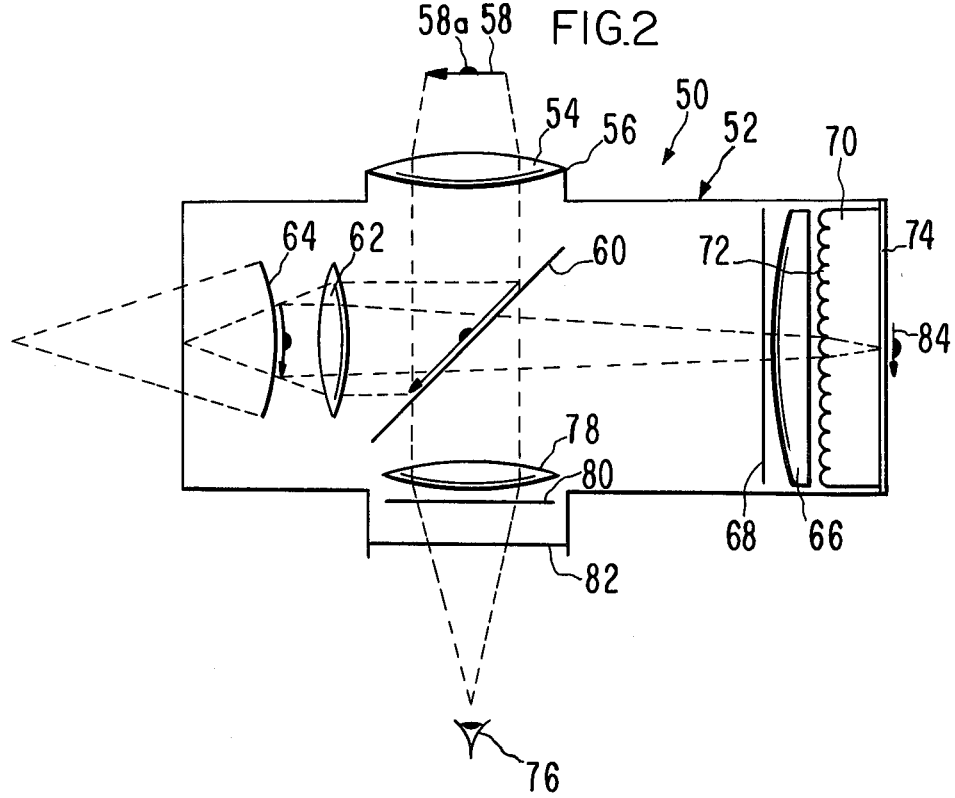

FIG. 1 is a schematic view of one embodiment of the instantaneous three-dimensional camera of this invention; and FIG. 2 is a schematic view of a second embodiment of the instantaneous three-dimensional camera.

The first embodiment of the instantaneous three-dimensional camera of the present invention is broadly denoted by the numeral 10 and includes a camera housing 12 having a convex lens 14 across an entrance opening 16 to allow light rays from an object 18 to be photographed to enter the camera housing 12. A beamsplitter 20 is mounted in housing 12 in optical alignment with lens 14. Beamsplitter 20 comprises a half-silvered mirror which allows incoming light rays, indicated by dashed lines in FIG. 1, to pass through the beamsplitter and onto a concave mirror 22 also mounted in housing 12 in optical alignment with lens 14. Mirror 22 serves to reflect the light rays back toward and onto beamsplitter 20 to reverse or invert the image of object 18 and to focus the light rays.

The beamsplitter 20 and mirror 22 are located near one end 24 of housing 12. Near the opposite end of the housing is a space 26 for receiving a transparent lenticular sreen 28. Screen 28 is adjacent to a film 30 having an emulsion thereon which is to be exposed by light rays passing through screen 28. Film 30 can have its emulsion applied to one face of screen 28 or the film can be separate therefrom. Both the screen and the film are removable from housing 12.

The screen has a lenticulated surface 32 which faces beamsplitter 20, surface 32 being adjacent to a plano-convex lens 34 mounted in housing 12 in any suitable manner in the path of light rays passing from beamsplitter 20 to screen 28. A suitable shutter 36, such as a curtain shutter, is provided adjacent to lens 34. The shutter is operated in any suitable fashion as is well known in the art. The shutter can be at other location in housing 12, if desired, such as near lens 14. Lens 34 serves as a field flattener to cause light rays passing therethrough to be rendered generally parallel or at least perpendicular to the lenticulations of surface 32 of screen 28.

Film 30 can be of the self-developing type. Thus, as soon as the film is exposed, it can be processed by the user and an observable image on the film will be provided in a relatively short time.

In use, camera 10 can be mounted on a tripod or can be hand-held. The only moveable part of the camera is the movement of the shutter and this shutter movement can be triggered in any suitable manner. Assuming that object 18 is to be photographed, the camera is aimed so that the object is optically aligned with lens 14. To indicate how the image of object 18 is directed through the camera to film 30, a lateral projection 18a is on object 18 is shown in the images of object 18 on beamsplitter 20 and on film 30.

As the image represented by the light rays from object 18 is directed into camera 12 through lens 14, the image passes through beamsplitter 20 and is reflected by mirror 22 back to the beamsplitter. The image of projection 18a is inverted by mirror 22 so that image of the projection extends downwardly from the beamsplitter as shown in FIG. 1. Then the beamsplitter reflects the image of the object toward lens 34, screen 38 and film 30.

When shutter 36 is actuated, the light rays representing the image on the underside of beamsplitter 20 pass through lens 34 and are collimated so that the light rays are substantially perpendicular to the lenticulated surface 32 of screen 28. Then the rays pass through screen 28 and onto film 30 which is exposed by the light rays. Thereafter, the film is developed and the resulting image 19 thereon can be observed in three dimensions using screen 28 or an identical screen, the person viewing the screen looking through lenticulated surface 32 to film 30 which is located immediately to the rear of the screen in the manner shown in FIG. 1.

When viewing image 19 through screen 28, the observer will see the projection 18a in the film image extending rearwardly of the plane of the film as shown in FIG. 1. In this way, the image of object 18 is the same as that viewed by the camera through lens 14. This is a true three-dimensional image of object 18 rather than a pseudo image which is the only image obtainable with conventional cameras using lenticulated screens and fixed films.

The lenticulation of screen 28 provide a series of images 19 of object 18 on film 30. Thus, regardless of the angle at which a person views the lenticulations, the person always see image 19 on film 30 in three-dimensions.

Lens 14 of camera 10 may be omitted if desired. Also, the camera may be used to photograph objects located in the range of infinity up to a location near the camera. However, lens 14 is preferred to permit focal changes because of variations in the position of the object to be photographed.

A second embodiment of the instantaneous three-dimensional camera of the present invention is broadly denoted by the numeral 50 and includes a camera housing 52 having a lens 54 across an entrance opening 56 for light rays emanating from an object 58 to be photographed. A beamsplitter 60 is mounted in housing 52 in optical alignment with lens 54. The beamsplitter is in the form of a half silvered mirror which permits some of the light rays entering camera housing to be reflected to the left when viewing FIG. 2. The remainder of the light rays pass through the beamsplitter to a frosted glass 82 for viewing. A lens 70 and a dark slide 80 are near glass 82.

The reflected light rays from beamsplitter 60 are generally parallel and are directed through a convex lens 62 mounted in housing 52 between beamsplitter 60 and a convex mirror 64. The light rays from lens 62 converge to mirror 64, then are reflected by mirror 64 and become parallel rays which return through lens 62 which cause them to converge and pass once again through beamsplitter 60. The convergent rays pass to the opposite end of camera 52 through a plano-convex lens 66 when an adjacent curtain shutter 68 is opened.

A lenticulated screen 70 having a lenticulated surface 72 is located between lens 66 and the adjacent end of camera housing 52. A film 74 against the opposite, flat face of screen 70 is exposed when light rays pass through screen 70. Screen 70 is substantially the same in construction as screen 28 of camera 10 and operates for the same purpose and in the same manner as screen 28.

In use, camera 50 can be hand-held or mounted on a tripod. When photographing object 58, which has a projection 58a in FIG. 2 to illustrate three-dimensional effects, the camera receives light rays from the object which pass through lens 54 and are intercepted by beamsplitter 60. The rays passing through the beamsplitter can be viewed by the eye 76 of an observer after the rays have passed through lens 78, past dark slide 80 and through frosted glass 82.

The light rays reflected to the left of beamsplitter 60 are caused to converge by lens 62 to mirror 64 which reflects the light rays and renders them parallel once again. After the parallel light from mirror 64 passes through lens 62 and beamsplitter 60, they are directed past curtain shutter 68, through lens 66, through screen 70 and onto film 74. Lens 66 renders the light rays substantially perpendicular to the lenticulated surface 72 of screen 70. The resulting image 84 on the film will have the projection extending to the right as shown in FIG. 2, so that the image will be a true three-dimensional image when it is viewed by an observer looking through screen 70 with film 74 in abutment therewith as shown in FIG. 2.

What is claimed is:

1. A camera comprising: a housing having an opening for receiving light rays emanating from an object to be photographed, said housing having a space remote from said opening for receiving a photographic film; a lenticular screen between the opening and the film-receiving space, said screen having a first, lenticulated surface and a second flat surface contiguous to said space; and a pair of mirrors in the path of the light rays from the object for forming and inverting the image of the object and for focusing the light rays onto the lenticulated surface of the screen, one of the mirrors being a beamsplitter and the other mirror being a convex mirror, whereby the light rays will be directed through said screen and onto the film when the film is in said space to result in the image of the object on the film.

2. A camera as set forth in claim 1, wherein is included a light converging lens between the beamsplitter and the convex mirror.

3. A camera as set forth in claim 1, wherein said housing is elongated to present a pair of opposed ends, the convex mirror being adjacent to one end of the housing and the screen being adjacent to the opposite end thereof.

* * * * *